F. W. POST & A. M. MORLEY.
BATTERY GRID.
APPLICATION FILED AUG. 21, 1906.
904,645.
Patented Nov. 24, 1908.
2 SHEETS—SHEET 1.
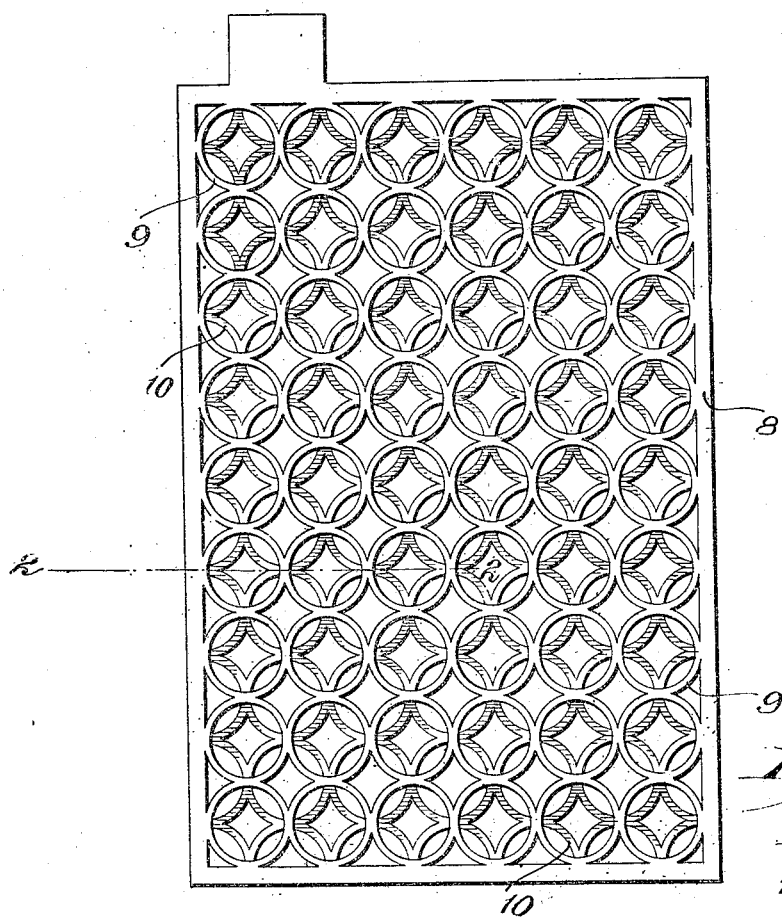
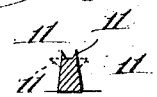
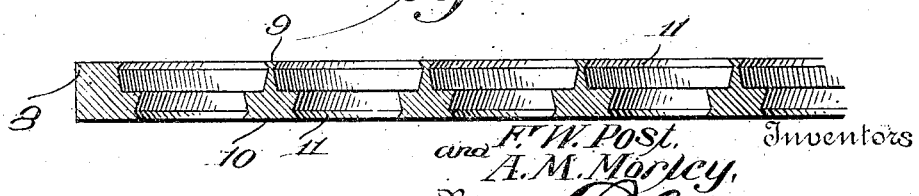
Witnesses
Louis C. Starke
Inventors
F. W. Post
A. M. Morley,
By
C. G. Siggers
Attorney F. W. POST & A. M. MORLEY.
BATTERY GRID.
APPLICATION FILED AUG. 21, 1906.
904,645.
Patented Nov. 24, 1908.
2 SHEETS—SHEET 2.
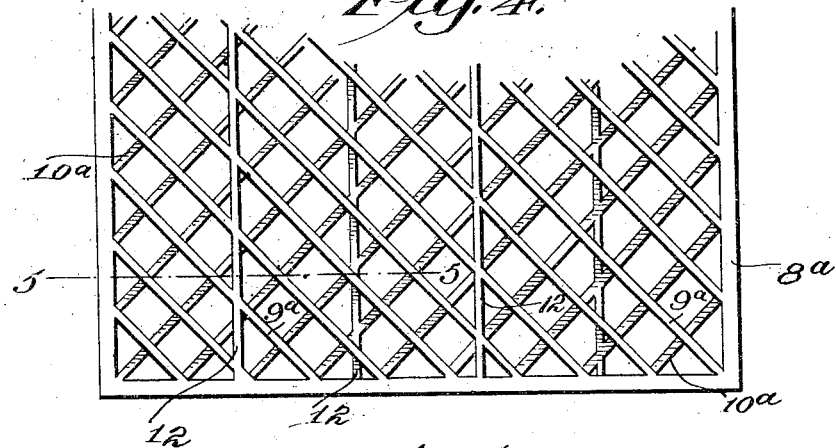
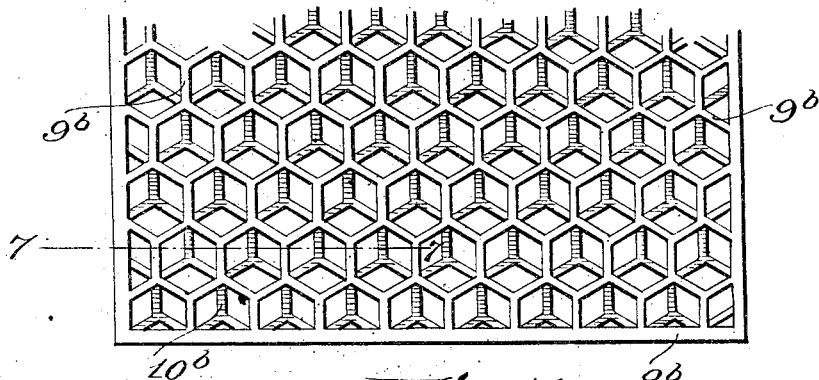
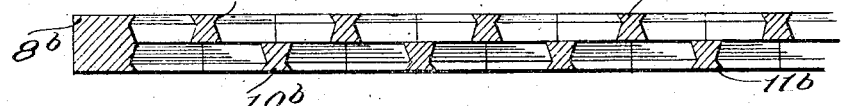
Witnesses
Louis C. Starke
Inventors
F. W. Post
A. M. Morley
By E. G. Siggers
Attorney

UNITED STATES PATENT OFFICE.

FRANKLIN W. POST AND ARCHIE M. MORLEY, OF LOS ANGELES, CALIFORNIA.

BATTERY-GRID.

No. 904,645.   Specification of Letters Patent.   Patented Nov. 24, 1908.

Application filed August 21, 1906. Serial No. 331,520.

*To all whom it may concern:*

Be it known that we, FRANKLIN W. POST and ARCHIE M. MORLEY, citizens of the United States, residing at Los Angeles, in the county of Los Angeles and State of California, have invented a new and useful Battery-Grid, of which the following is a specification.

This invention relates to grids or accumulator plates for storage or secondary batteries, and the principal object is to provide an article of manufacture of the above character that can be cheaply produced, is strong and durable so as to withstand high charges and discharges, will effectively maintain the active material in place without dividing it up into small practically separated sections, and will maintain its shape sufficiently to permit its being filled several times with the active material before it breaks down.

Several embodiments of the invention are illustrated in the accompanying drawings, wherein:—

Figure 1 is a side elevation of the preferred form of grid. Fig. 2 is a sectional view on an enlarged scale through a portion of the same and on the line 2—2 of Fig. 1. Fig. 3 is a detail sectional view through one of the ribs prior to the formation of the outstanding flanges. Fig. 4 is a side elevation of a portion of another embodiment of the invention. Fig. 5 is a detail sectional view on the line 5—5 of the same. Fig. 6 is a side elevation of another embodiment of the invention. Fig. 7 is a sectional view on the line 7—7 thereof.

Similar reference numerals designate corresponding parts in all the figures of the drawings.

In the embodiment illustrated in the first three figures, the plate is a single integral structure, comprising a marginal frame 8, between which are located opposite sets of ribs 9 and 10, said sets being disposed in different planes with their inner faces abutted and integrally joined, and each set constituting substantially one-half of the thickness of the grid.

As shown in Fig. 1, the ribs are circular in form, their abutted portions being integrally joined to one another, and to the marginal frame 8. It will also be observed by reference to this figure that the ribs of one set extend across the spaces between the ribs of the other set. As a result when the active material is placed in position, that which is located in the spaces bounded by one set of ribs, is in direct connection with that located in the spaces between the other set, and the material is thus practically continuous throughout the grid.

It will be observed by reference to Fig. 2 that the ribs taper outwardly in opposite directions, and in order to properly maintain the material in place, the outer marginal portions of said ribs are provided with oppositely extending longitudinally disposed flanges 11, which flanges extend into the spaces between the ribs and constitute holding means for the material placed in said spaces. The marginal frame, which is as thick as both sets of ribs, also has inset flanges along its opposite inner edges.

In constructing the grid, the following composition is employed, which has been found peculiarly suitable for the purpose, the following proportions being preferred: bismuth, two parts; antimony two parts; tin, one part; and lead, ninety-five parts, which compound forms a very tough and elastic metal, molded under pressure, so as to make a very compact condensed structure. In the manufacture of the grids, the flanges 11 are molded, as shown in Fig. 3, being afterwards upset, as shown in dotted lines in said figure. After the grids are cast, the flanges, turned outwardly on the ribs, are preferably put through a bath of chemical alkalin nitrate and lead sulfate, the grids then being in proper shape for filling or pasting. Grids as thus constructed have been found highly advantageous in storage or secondary batteries, in that they are strong and durable, and can be filled with peroxid or active material several times before breaking down. Moreover they will withstand, without injury, high charges and discharges, and will effectively maintain the active material in place.

A slightly different form of construction is shown in Figs. 4 and 5, wherein the marginal frame is shown at 8ª, the sets of ribs 9ª and 10ª being disposed at substantially right angles to each other, the ribs of each set being parallel. These ribs, as in the former construction, are provided with marginal retaining flanges 11ª, and reinforcing or strengthening braces 12 may be employed if desired.

Still another embodiment of the invention is illustrated in Figs. 6 and 7, wherein the marginal frame is shown at 8ᵇ, and the sets of ribs are designated respectively 9ᵇ and 10ᵇ. In this instance, said ribs form polygons, and are provided with retaining flanges 11ᵇ.

From the foregoing, it is thought that the construction, operation, and many advantages of the herein described invention will be apparent to those skilled in the art, without further description, and it will be understood that various changes in the size, shape, proportion, and minor details of construction, may be resorted to without departing from the spirit or sacrificing any of the advantages of the invention.

Having thus fully described our invention, what we claim as new, and desire to secure by Letters Patent, is:—

A battery grid, comprising opposite sets of spaced ribs disposed in different planes, the ribs of the different sets being integrally joined together, and those in one set extending across the spaces between those of the other set, said ribs being composed of densely compacted metal and being oppositely and outwardly tapered, a marginal frame of the thickness of both sets of ribs and integral therewith, said frame surrounding both sets of ribs, and oppositely extending longitudinally disposed retaining flanges formed upon these outer edges and arranged along the outer margins of the ribs and along the opposite inner edges of the frame.

In testimony that we claim the foregoing as our own, we have hereto affixed our signatures in the presence of two witnesses.

FRANKLIN W. POST.
ARCHIE M. MORLEY.

Witnesses:
 CHAS. O. BRADLEY,
 H. H. ROUSE.